United States Patent
Boyko et al.

(10) Patent No.: US 10,612,509 B2
(45) Date of Patent: Apr. 7, 2020

(54) VEHICLE AND METHOD PRE-FLUXING AN ENGINE STARTER MOTOR IN A VEHICLE

(71) Applicant: FORD GLOBAL TECHNOLOGIES, LLC, Dearborn, MI (US)

(72) Inventors: Anthony Boyko, Dearborn Heights, MI (US); Stephen Powell, Troy, MI (US); Patrick Gordon Collins, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 16/122,276

(22) Filed: Sep. 5, 2018

(65) Prior Publication Data

US 2020/0072176 A1 Mar. 5, 2020

(51) Int. Cl.
| | | |
|---|---|---|
| *F02N 11/08* | (2006.01) | |
| *H02P 6/28* | (2016.01) | |
| *H02P 29/60* | (2016.01) | |

(52) U.S. Cl.
CPC .............. *F02N 11/08* (2013.01); *H02P 6/28* (2016.02); *F02N 2200/023* (2013.01); *F02N 2200/024* (2013.01); *F02N 2200/044* (2013.01); *H02P 29/60* (2016.02)

(58) Field of Classification Search
CPC ...... F02N 11/04; F02N 11/0859; F02N 11/08; F02N 2300/108; F02N 2200/023; F02N 2200/024; F02N 2200/044; F02D 2041/2044; H02P 6/28
See application file for complete search history.

(56) References Cited

U.S. PATENT DOCUMENTS

| | | | |
|---|---|---|---|
| 6,335,609 B1 | 1/2002 | Amey et al. | |
| 6,792,321 B2 * | 9/2004 | Sepe, Jr. | G05B 15/02 700/65 |
| 7,103,460 B1 * | 9/2006 | Breed | B60C 23/0408 701/29.1 |
| 8,401,770 B2 | 3/2013 | Rouis | |
| 9,184,646 B2 * | 11/2015 | Fulton | F02N 15/067 |
| 10,451,018 B2 * | 10/2019 | Straker | F02N 11/0803 |
| 10,487,791 B1 * | 11/2019 | Hao | H02P 21/16 |
| 2016/0114801 A1 * | 4/2016 | Park | B60W 30/18 701/22 |
| 2019/0338745 A1 * | 11/2019 | Hao | H02P 21/16 |

FOREIGN PATENT DOCUMENTS

FR 3049919 A1 10/2017

* cited by examiner

*Primary Examiner* — Hai H Huynh
*Assistant Examiner* — Gonzalo Laguarda
(74) *Attorney, Agent, or Firm* — David Kelley; Brooks Kushman P.C.

(57) ABSTRACT

A vehicle includes an engine, an electric machine, and a controller. The electric machine is configured to start the engine. The controller is programmed to pre-flux the electric machine with current that has a magnitude that changes as temperature of the engine changes within a predefined range.

20 Claims, 5 Drawing Sheets

US 10,612,509 B2

VEHICLE AND METHOD PRE-FLUXING AN ENGINE STARTER MOTOR IN A VEHICLE

TECHNICAL FIELD

The present disclosure relates to vehicles and methods for controlling engine starter motors in vehicles.

BACKGROUND

Vehicles that include internal combustion engines may include starter motors that are configured to turn the engine during a starting sequence of the engine.

SUMMARY

A vehicle includes an engine, an electric machine, and a controller. The electric machine is configured to start the engine. The controller is programmed to pre-flux the electric machine with current that has a magnitude that changes as temperature of the engine changes within a predefined range.

A vehicle includes an engine, an electric machine, and a controller. The electric machine is configured to start the engine. The controller is programmed to, responsive to engine temperature being less than a threshold, inhibit delivering current to pre-flux the electric machine. The controller is further programmed to, responsive to engine temperature exceeding the threshold, deliver a commanded current to pre-flux the electric machine.

A vehicle includes an engine, an electric machine, and a controller. The electric machine is configured to start the engine. The controller is programmed to pre-flux the electric machine with current having a magnitude that changes as temperature of the electric machine changes within a predefined range.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
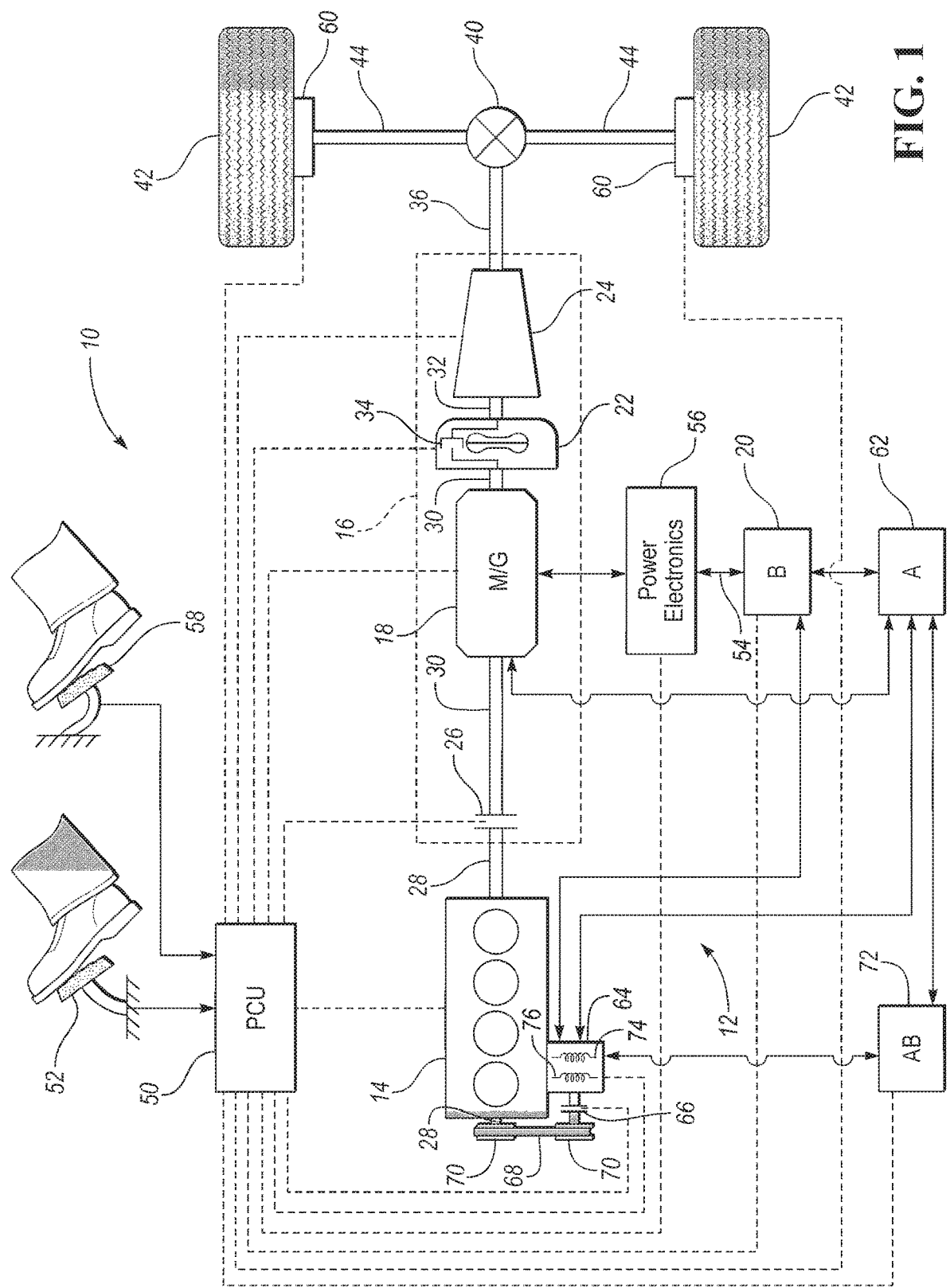
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10 that are configured to propel the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The battery 20 and the M/G 18 may also be configured to provide electrical power to one or more vehicle accessories 62. The vehicle accessories 62 may include, but are not limited to, air conditioning systems, power steering systems, electric heaters, or any other system or device that is electrically operated.

An integrated starter-generator (ISG) 64 may be coupled to the engine 14 (i.e., may be coupled to the crankshaft 28 of the engine 14). The ISG 64 is an electric machine that is configured to operate as a starter motor to start the engine 14 during an engine start-up event, or to provide additional torque to the powertrain 12 during vehicle operations. An accessory battery 72 may be configured to deliver electrical power to the ISG 64 to operate the ISG 64 as a motor. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68 it may be referred to as a belt integrated starter-generator (BISG). The controller 50 may be configured to transmit signals to the ISG 64 to operate the ISG 64 as either a motor or a generator. The controller may also be configured to transmit signals to the clutch 66 in order to open or close the clutch 66. The ISG 64 will be coupled to the engine 14 when the clutch is in a closed state and decoupled from the engine 14 when the clutch 66 is in an open state. The ISG 64 may be configured to provide electrical energy to charge the accessory battery 72, the traction battery 20, or provide electrical energy to power the vehicle accessories 62 when operating as a generator. The accessory battery 72 may also be configured to power the vehicle accessories 62.

A rotor of the ISG 64 includes one or more rotor coils 74 and a stator of the ISG 64 includes one or more stator coils 76. The interaction of the magnetic flux provided by the rotors coils 74 when energized via a first electric current with a second electric current flowing through the stator coils 76 produces torque that drives the engine 14 during an engine start. The first and second electric currents that are utilized to energize the rotor coils 74 and the stator coils 76, respectively, may be delivered to the coils from the accessory battery 72 or any other power source. In order to quickly provide torque during an engine start, a pre-flux current may be provided to the rotor coils 74 when the engine 14 is off and while no current is being commanded to the stator coils 76. This allows the ISG 64 to immediately provide torque to the engine 14 when electric current is applied to energize the stator coils 76.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the schematic illustrated in FIG. 1 is merely representative and is not intended to be limiting. Other configurations are contemplated that utilize selective engagement of both an engine and a motor to transmit power through the transmission. For example, the M/G 18 may be offset from the crankshaft 28, and/or the M/G 18 may be provided between the torque converter 22 and the gearbox 24. Other configurations are contemplated without deviating from the scope of the present disclosure.

It should further be understood that the vehicle configuration described herein is merely exemplary and is not intended to be limited. Other non-hybrid or hybrid vehicle configurations should be construed as disclosed herein. Other vehicle configurations may include, but are not limited to, micro-hybrid vehicles (i.e., vehicles having only an engine as the power source where the engine is configured to stop under certain conditions to increase fuel economy), series hybrid vehicles, parallel hybrid vehicles, series-parallel hybrid vehicles, plug-in hybrid electric vehicles (PHEVs), or any other vehicle configuration known to a person of ordinary skill in the art.

Hybrid vehicles and vehicles that include engine start/stop systems may conserve fuel by shutting down the engine when the electric components of the power train (battery, motor, etc.) can meet the demands of the driver, when the vehicle is at a standstill, while the vehicle is decelerating, or at any other time where power output from the engine is not required. This strategy however, requires the engine to start much more often over the vehicle lifetime than a conventional vehicle. This number far exceeds the capabilities of traditional 12V flywheel starters, so alternatives such as belted integrated starter/generators (BISGs) are used instead. These alternative starting devices, however, may not provide enough torque to crank large diesel or gasoline engines such as those used in large commercial vehicles. Furthermore, the torque required to crank the engine increases dramatically as the temperature of the engine increases, which leads to more failed cranks once the vehicle is at standard operating temperature.

A proposed solution is to pre-flux the engine starting device (e.g., ISG 64). Pre-fluxing the engine starting device increases amount of torque being transferred to the engine crankshaft and decreases the time period required to deliver an increased amount of torque to the crankshaft. Pre-fluxing includes magnetically saturating rotor coils of the engine starting device with electric current from an electrical power source (e.g., accessory battery 72) such that the engine starting device provides torque as fast as possible once an engine start command is sent. A drawback of pre-fluxing the engine starting device is that it requires additional energy, which may increase fuel consumption. In order to minimize pre-fluxing and in order to only utilize pre-fluxing where it is most likely desired (e.g., during an engine restart where the engine is already at operating temperature), it may be advantageous to only pre-flux the engine starting device when engine temperature dictates that it is appropriate to do so and to adjust the current being delivered to the engine starting device relative to an increase or decrease in the torque required to start the engine, which respectively increases or decreases relative to an increase or decrease in engine temperature.

Figure 2:
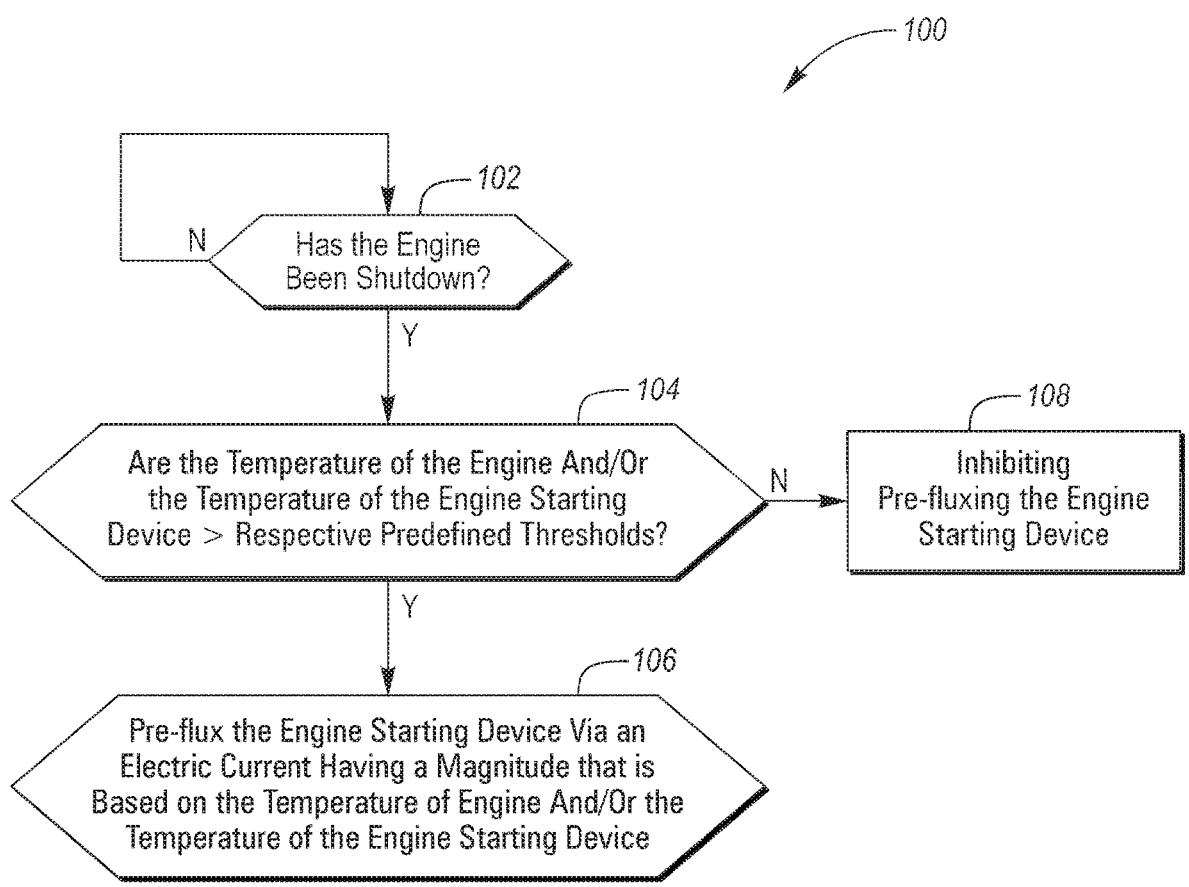
FIG. 2 is a flowchart illustrating a method of pre-fluxing an engine starting device.

Referring to FIG. 2, a method 100 of pre-fluxing an engine starting device (e.g., ISG 64) is illustrated. The method 100 may be stored as control logic and/or an algorithm within the controller 50. The controller 50 may implement the method 100 by controlling the various components of the vehicle 10. The method 100 is initiated at block 102, where it is determined if the engine 14 has been shutdown. If the engine 14 has not been shutdown, the method 100 recycles back to the beginning of block 102. If the engine 14 has been shutdown, the method 100 moves on to block 104.

At block 104, it is determined if the temperature of the engine 14 and/or the temperature of the engine starting device are greater than first and second predefined thresholds, respectively. If the temperature of the engine 14 and/or the temperature of the engine starting device are greater than their respective predefined thresholds, the method 100 moves on to block 106 where a commanded electric current is delivered to the engine starting device from an electric power source to pre-flux the engine starting device (e.g., the accessory battery 72 delivers an electric current to rotor coils 74 of the ISG 64 to pre-flux the rotor coils 74 of the ISG 64). The commanded electric current that is delivered to pre-flux the engine starting device, has a magnitude that is based on the temperature of the engine 14 and/or the temperature of the engine starting device. More specifically, the controller 50 is configured to increase the commanded electric current to pre-flux the engine starting device responsive to increases in the temperature of the engine 14 and/or increases in the temperature of the engine starting device above their respective predefined thresholds and within respective predefined ranges (e.g., a first range relative to engine temperature and a second range relative to the temperature of the engine starting device) above their respective predefined thresholds.

The temperatures of the engine 14 and the engine starting device (e.g., ISG 64) may be determined by temperature sensors which communicate the current temperatures of the engine 14 and the engine starting device to the controller 50. Specifically, the temperature of the engine 14 may be a measured temperature of the engine oil, the engine coolant, the engine block, or an estimated temperature that is based on a measured temperature of other vehicle components (e.g., the temperature of fluid within the transmission).

Returning to block 104, if the temperature of the engine 14 and the temperature of the engine starting device are not greater than their respective predefined thresholds, the method 100 moves on to block 108 where the controller 50 prevents or inhibits pre-fluxing the engine starting device. It should be understood that the flowchart in FIG. 2 is for illustrative purposes only and that the method 100 should not be construed as limited to the flowchart in FIG. 2. Some of the steps of the method 100 may be rearranged while others may be omitted entirely. Furthermore, it should be understood that the method 100 may be adjusted such that the magnitude of the pre-flux current being delivered to the engine starting device and whether the controller 50 is preventing or inhibiting the pre-flux current may be solely dependent on either the temperature of the engine 14 or the temperature of the engine starting device.

Figure 3:
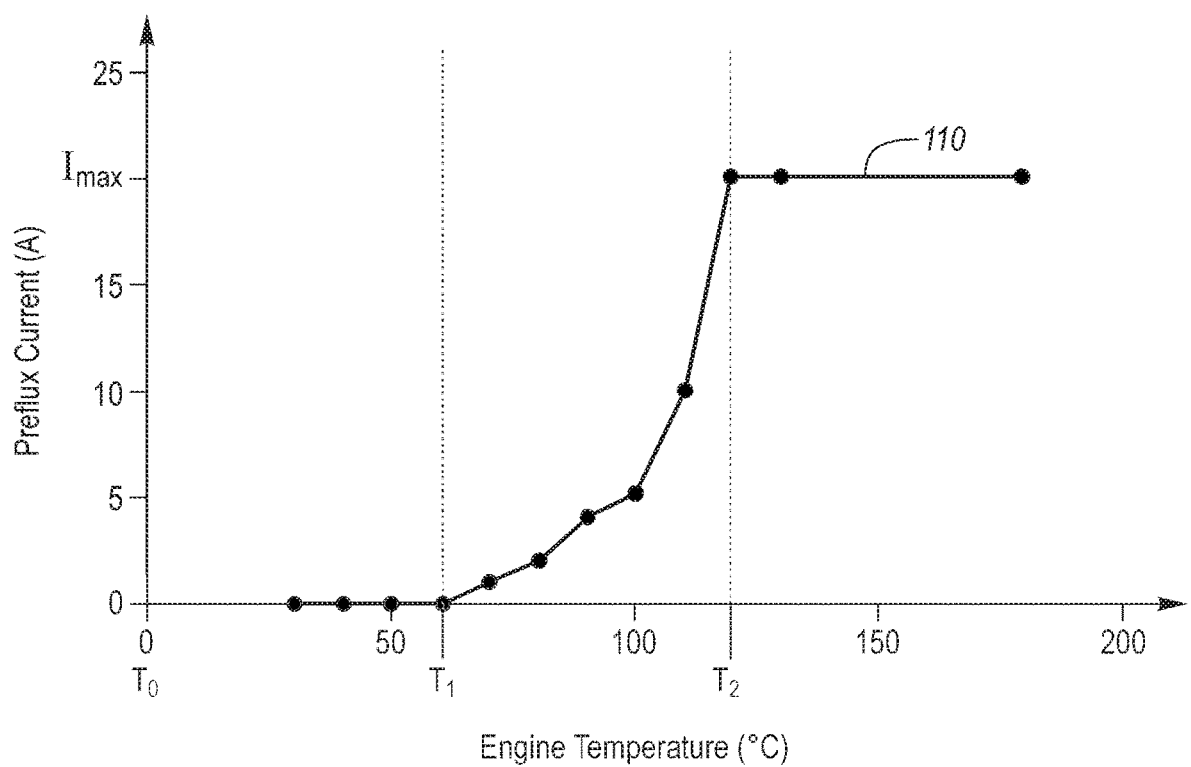
FIG. 3 is a two-dimensional graphical representation of a commanded pre-flux current being delivered to the engine starting device relative to engine temperature.

Referring to FIG. 3, a two-dimensional graphical representation of the commanded pre-flux current being delivered to the engine starting device (e.g., ISG 64) relative to the engine temperature is illustrated. The commanded pre-flux current being delivered to the engine starting device is shown as line 110. FIG. 3 is an example of where the magnitude of the pre-flux current being delivered to the engine starting device is solely based on the temperature of the engine 14. Between temperatures $T_0$ and $T_1$, the magnitude of the commanded electric current to pre-flux the engine starting device is zero. This corresponds to a scenario where the temperature of the engine 14 is less than the predefined threshold temperature such that the controller 50 inhibits pre-fluxing the engine starting device (see block 108 in FIG. 2). At engine temperatures that range between $T_1$ and $T_2$, the magnitude of the commanded electric current to pre-flux the engine starting device is gradually increased according to predefined or calibrated values from zero at temperature $T_1$ to a maximum commanded value $I_{max}$ at temperature $T_2$. This corresponds to the predefined range (i.e., between temperatures $T_1$ and $T_2$) above the threshold temperature of the engine 14 (i.e., temperature $T_1$) where the commanded electric current to pre-flux the engine starting device is increased as the temperature of the engine 14 increases (see block 106 in FIG. 2). At temperatures of $T_2$ and above, the commanded electric current to pre-flux the engine starting device corresponds to the maximum commanded value $I_{max}$.

It should be understood that the graph in FIG. 3 may also represent an example where the magnitude of the pre-flux current being delivered to the engine starting device is solely based on the temperature of engine starting device (e.g., ISG 64). The temperature values and the predefined or calibrated values utilized to gradually increase the electric current pre-fluxing the engine starting device from zero at temperature $T_1$ to the maximum commanded value $I_{max}$ at temperature $T_2$, however, may be different than the values depicted in FIG. 3.

Figure 4:
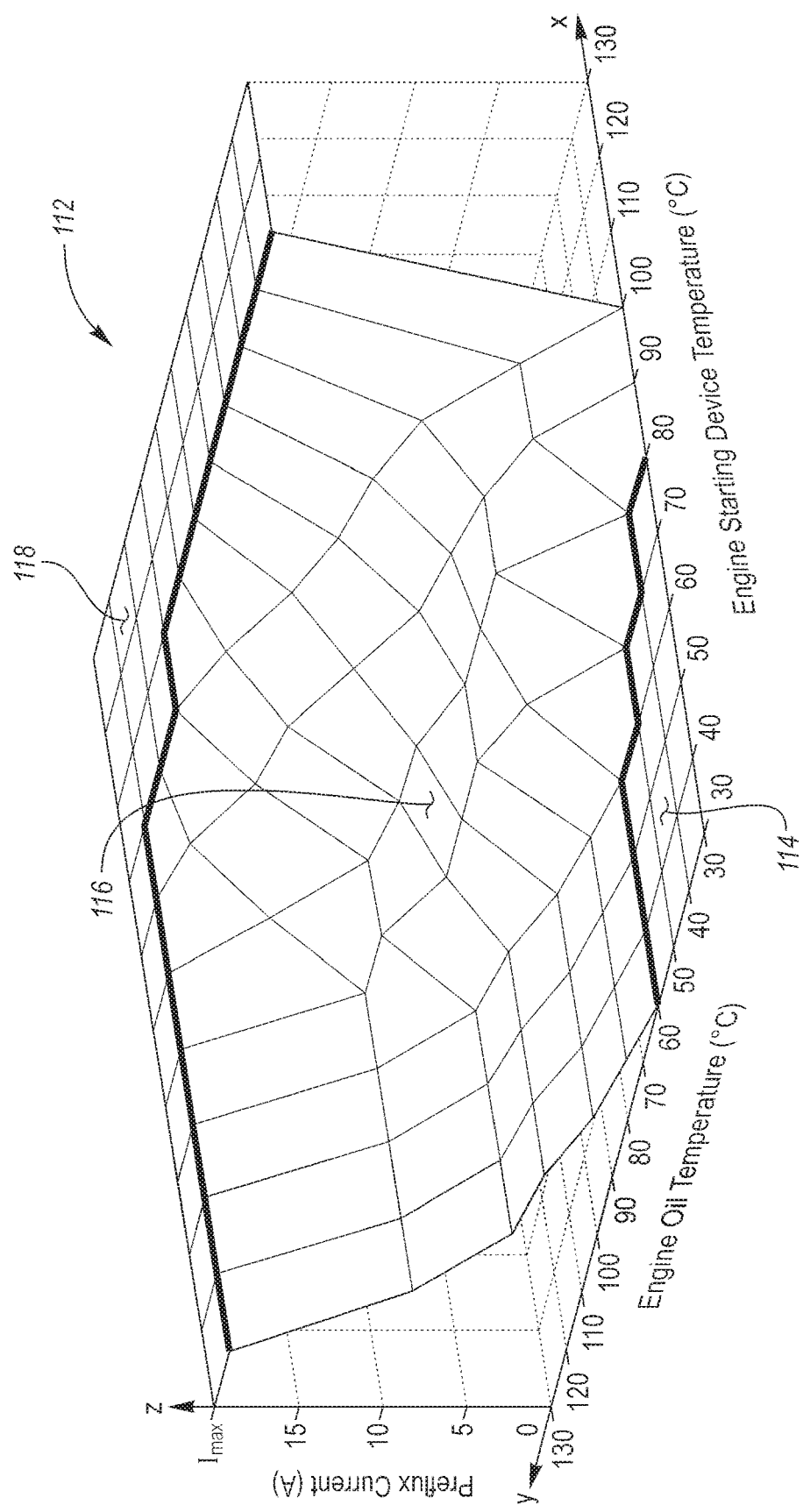
FIG. 4 is a three-dimensional graphical representation of the commanded pre-flux current being delivered to the engine starting device relative to engine temperature and the temperature of the engine starting device.

Referring to FIG. 4, a three-dimensional graphical representation of the commanded pre-flux current being delivered to the engine starting device (e.g., ISG 64) relative to the engine temperature and to the temperature of the engine starting device is illustrated. The commanded pre-flux current being delivered to the engine starting device is shown as surface 112. The commanded pre-flux current being delivered to the engine starting device has a value that increases along a Z-axis in response to increases in the temperature of the engine 14 along a Y-axis and in response to increases in the temperature of the engine starting device along an X-axis.

Within a first region 114 of the surface 112, the combination of the engine temperature and the temperature of the engine starting device dictate that the magnitude of the commanded electric current to pre-flux the engine starting device is zero. This corresponds to a scenario where the temperatures of the engine 14 and/or the engine starting device are less than respective predefined threshold temperatures such that the controller 50 inhibits pre-fluxing the engine starting device (see block 108 in FIG. 2).

Within a second region 116 of the surface 112, the commanded electric current to pre-flux the engine starting device is gradually increased according to predefined or calibrated values from zero to a maximum commanded value $I_{max}$ as the temperature of the engine 14 and/or the temperature of the engine starting device increase. The second region 116 corresponds to predefined ranges of the temperature of the engine 14 and/or the temperature of the engine starting device that are above temperature thresholds of the engine 14 and the engine starting device, respectively, where the commanded electric current to pre-flux the engine starting device is increased as the temperature of the engine 14 and/or the temperature of the engine starting device increases (see block 106 in FIG. 2). Within a third region 118 of the surface 112, where the temperatures of the engine 14 and/or the engine starting device are relatively higher than within the second region 116, the commanded electric current to pre-flux the engine starting device corresponds to the maximum commanded value $I_{max}$.

Figure 5:
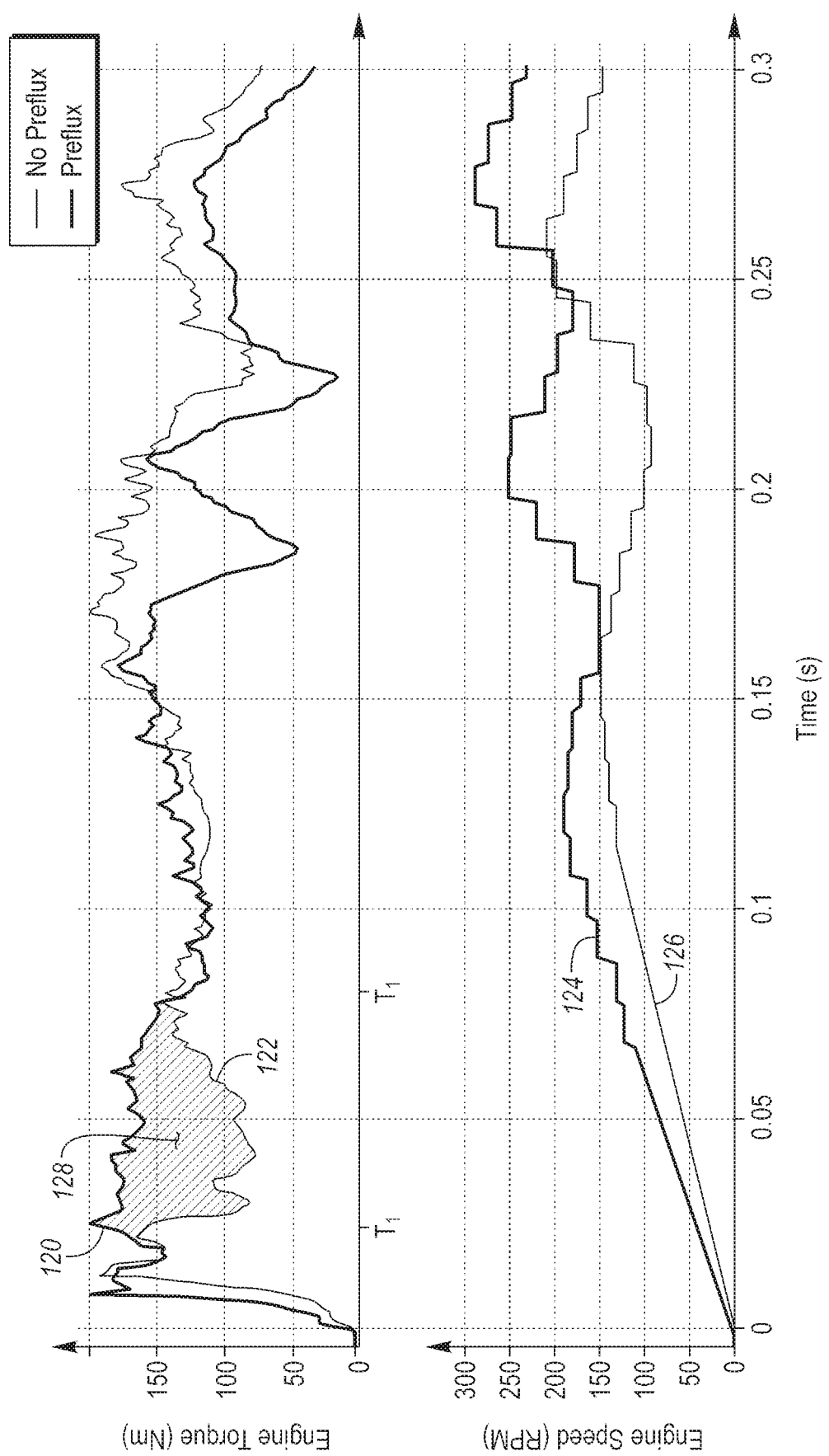
FIG. 5 is a two-dimensional graphical representation that compares engine torque and engine speed during a starting sequence of the engine where a pre-flux current was applied to the engine starting device relative to a starting sequence of the engine where no pre-flux current was applied to the engine starting device.

FIG. 5 is a two-dimensional graphical representation that compares engine torque and engine speed during a starting sequence of the engine 14 where a pre-flux current was applied to the engine starting device relative to a starting sequence of the engine 14 where no pre-flux current was applied to the engine starting device. Engine torque (i.e., the torque at the engine crankshaft 28) during a starting sequence where a pre-flux current was applied to the engine starting device (i.e., ISG 64) is illustrated by line 120, engine torque during a starting sequence where no pre-flux current was applied to the engine starting device is illustrated by line 122, engine speed (i.e., speed of the engine 14) during a starting sequence where a pre-flux current was applied to the engine starting device is illustrated by line 124, and engine speed during a starting sequence where no pre-flux current was applied to the engine starting device is illustrated by line 126. The torque gained at the initiation of the starting sequence that results from pre-fluxing the engine starting device is observed within the hatched area 128. The torque gained 128 compensates for any additional torque that may be required to start the engine 14, when the engine 14 is operating at higher temperatures. Furthermore, the additional torque that results from pre-fluxing the engine starting device allows the engine 14 to be brought up to operating speed at a faster pace (which is observed as the difference between lines 124 and 126).

It should be understood that the designations of first, second, third, fourth, etc. for predefined thresholds, predefined ranges of temperature, or any other component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an engine;
   an electric machine configured to start the engine; and
   a controller programmed to,
      responsive to engine temperature being less than a threshold, inhibit delivering current to pre-flux the electric machine,
      responsive to the engine temperature exceeding the threshold, deliver a commanded current to pre-flux the electric machine, wherein the commanded current has a magnitude that changes as temperature of the engine changes within a predefined range, the predefined range having values that are greater than the threshold.

2. The vehicle of claim 1, wherein the magnitude of the current changes as temperature of the electric machine changes within a second predefined range.

3. The vehicle of claim 1, wherein the controller is configured to pie-flux the electric machine only when the engine is shutdown.

4. The vehicle of claim 1, wherein pre-fluxing the electric machine includes pre-fluxing rotor coils of the electric machine.

5. The vehicle of claim 1, wherein the temperature of the engine is a measured engine oil temperature.

6. The vehicle of claim 1, wherein the temperature of the engine is a measured engine coolant temperature.

7. The vehicle of claim 1, wherein pre-fluxing the electric machine includes delivering electric current to rotor coils of the electric machine while inhibiting delivering electric current to stator coils of the electric machine.

8. A vehicle comprising:
   an engine;
   an electric machine configured to start h engine; and
   a controller programmed to,
      responsive to engine temperature being less than a threshold, inhibit delivering current to pre-flux the electric machine, and
      responsive to the engine temperature exceeding the threshold, deliver a commanded current to pre-flux the electric machine.

9. The vehicle of claim 8, wherein the controller is further programmed to, responsive to increases in the engine temperature above the threshold, increase the commanded current.

10. The vehicle of claim 8, wherein the controller is further programmed to,
   responsive to electric machine temperature being less than a second threshold, inhibit delivering current to pre-flux the electric machine, and
   responsive to the electric machine temperature exceeding the second threshold, deliver a second commanded current to pre-flux the electric machine.

11. The vehicle of claim 8, wherein the controller is configured to deliver current to pre-flux the electric machine only when the engine is shutdown.

12. The vehicle of claim 8, wherein pre-fluxing the electric machine includes pre-fluxing rotor coils of the electric machine.

13. The vehicle of claim 8, wherein the engine temperature is a measured engine oil temperature.

14. The vehicle of claim 8, wherein the engine temperature is a measured engine coolant temperature.

15. A vehicle comprising:
   an engine;
   an electric machine configured to start the engine; and
   a controller programmed to,
      responsive to engine temperature being less than a threshold, inhibit delivering current to pre-flux the electric machine, and
      responsive to the engine temperature exceeding the threshold, deliver a commanded current to me-flux the electric machine, wherein the commanded current has a magnitude that changes as temperature of the electric machine changes within a predefined range, the predefined range having values that are greater than the threshold.

16. The vehicle of claim 15, wherein the magnitude of the current changes as temperature of the engine changes within a second predefined range.

17. The vehicle of claim 16, wherein the temperature of the engine is a measured engine oil temperature.

18. The vehicle of claim 15, wherein pre-fluxing the electric machine includes pre-fluxing rotor coils of the electric machine.

19. The vehicle of claim 15, wherein the controller is configured to pre-flux the electric machine only when the engine is shutdown.

20. The vehicle of claim 15, wherein pre-fluxing the electric machine includes delivering electric current to rotor coils of the electric machine while inhibiting delivering electric current to stator coils of the electric machine.

* * * * *